(12) United States Patent
Manneschi

(10) Patent No.: US 11,906,686 B2
(45) Date of Patent: Feb. 20, 2024

(54) LUGGAGE DETECTOR

(71) Applicant: Alessandro Manneschi, Arezzo (IT)

(72) Inventor: Alessandro Manneschi, Arezzo (IT)

(*) Notice: Subject to any disclaimer, the term of this patent is extended or adjusted under 35 U.S.C. 154(b) by 306 days.

(21) Appl. No.: 17/426,874

(22) PCT Filed: Jan. 29, 2020

(86) PCT No.: PCT/EP2020/052184
§ 371 (c)(1),
(2) Date: Jul. 29, 2021

(87) PCT Pub. No.: WO2020/157145
PCT Pub. Date: Aug. 6, 2020

(65) Prior Publication Data
US 2022/0107440 A1    Apr. 7, 2022

(30) Foreign Application Priority Data

Jan. 30, 2019    (FR) ...................................... 1900854

(51) Int. Cl.
*G01V 3/12*    (2006.01)
*G01B 11/02*    (2006.01)
*G01V 3/10*    (2006.01)

(52) U.S. Cl.
CPC .............. *G01V 3/12* (2013.01); *G01B 11/026* (2013.01); *G01V 3/104* (2013.01)

(58) Field of Classification Search
None
See application file for complete search history.

(56) References Cited

U.S. PATENT DOCUMENTS

| | | | |
|---|---|---|---|
| 5,547,052 A * | 8/1996 | Latshaw | A45C 7/0045 190/102 |
| 5,592,083 A | 1/1997 | Magnuson et al. | |
| 5,659,247 A * | 8/1997 | Clements | G01V 3/15 324/202 |
| 5,974,111 A * | 10/1999 | Krug | G01N 23/20 378/53 |

(Continued)

FOREIGN PATENT DOCUMENTS

| | | |
|---|---|---|
| CN | 107991327 A | 5/2018 |
| EP | 0813685 A2 | 12/1997 |

(Continued)

OTHER PUBLICATIONS

French Search including Written Opinion for Application No. FR 1900854, dated Nov. 13, 2019, 12 pages.

(Continued)

*Primary Examiner* — Jas A Sanghera
(74) *Attorney, Agent, or Firm* — Lerner David LLP

(57) ABSTRACT

The present invention relates to a system for detecting illicit objects contained in a piece of luggage, characterized in that it comprises a carriage defining a housing (60) for receiving a piece of luggage and examination means (100, 200, 300) placed at the inlet of the housing (60) such that the introduction of the piece of luggage into the housing (60) induces a relative displacement between the piece of luggage and at least one of the examination means (200) and thus an automatic scanning of the piece of luggage by the examination means (200).

14 Claims, 14 Drawing Sheets

(56) References Cited

U.S. PATENT DOCUMENTS

| | | | |
|---|---|---|---|
| 2010/0085066 A1* | 4/2010 | Peschmann | G01V 5/0016 |
| | | | 378/57 |
| 2010/0201090 A1* | 8/2010 | Henniges | B65F 1/1468 |
| | | | 383/42 |
| 2017/0343666 A1* | 11/2017 | Manneschi | G01V 3/12 |
| 2017/0350834 A1 | 12/2017 | Prado et al. | |
| 2021/0239627 A1* | 8/2021 | Zhang | G01N 23/10 |

FOREIGN PATENT DOCUMENTS

| | | |
|---|---|---|
| EP | 3372188 A1 | 9/2018 |
| WO | 2018124905 A1 | 7/2018 |
| WO | 2018124905 A9 | 11/2018 |

OTHER PUBLICATIONS

International Search Report including Written Opinion for Application No. PCT/EP2020/052184, dated Apr. 17, 2020, 16 pages.

* cited by examiner

LUGGAGE DETECTOR

CROSS-REFERENCE TO RELATED APPLICATIONS

The present application is a national phase entry under 35 U.S.C § 371 of International Application No. PCT/EP2020/052184 filed Jan. 29, 2020, which claims priority from French Application No. 1900854 filed Jan. 30, 2019, all of which are hereby incorporated herein by reference.

TECHNICAL FIELD

The present invention relates to the field of detectors designed for detection of unauthorised objects or materials in a protected access zone.

More particularly, the present invention relates to a detector dedicated to searching for illicit objects contained in pieces of luggage.

The present invention applies quite particularly to access controls at sites where large numbers of people assemble in a short time frame, for example arenas or sports stadia or even concert halls or entertainment arenas.

The invention is not however limited to these particular applications and relates to access control at any site, for example stations, schools, shops, etc.

TECHNOLOGICAL BACKGROUND

Examining individuals accessing protected access zones has in fact formed the subject matter of many proposals.

Metal detectors are known, especially metal detectors using windings which operate via detection of inductive kind.

Body scanners using examination technologies based on microwaves are also known.

Body searches of individuals passing through gates or access zones performed by authorised operators are also known, of course.

Also known are X-ray systems for inspection of pieces of luggage, which are highly useful for displaying radio-opaque masses, for example metallic, but which have definite display limits for dielectric masses, or even explosives, which at times have attenuation characteristics of X-rays similar to those of common non-metallic materials. Another drawback to X-ray scanners is the difficulty in moving them to different sites for use since each new installation requires verification of scattered radiation by a trained professional. In addition, X-ray scanners for checking pieces of luggage are not capable of automatic detection of metallic weapons and explosives and consequently require a permanent operator for verification of images and engender high running costs. Finally, maintenance costs are also high due to the need for periodic replacement of the conveyor belt and of the vacuum source of X-rays.

But all known systems suffer from drawbacks. The reliability of some known systems needs to be addressed.

Many known systems are slow, in that they do not allow substantial flow or throughput rate of individuals.

In conclusion, known systems often cause security problems and discomfort for the public concerned.

Document WO 2018/124905 describes a system for detection of illicit objects for footwear comprising windings and variable condensers. Analysis of the footwear is made when the individual has placed his foot in the housing provided for this purpose.

Document US 2017/350834 describes a device for detection of explosive matter comprising a housing in which an object to be examined is placed. The analysis means are oriented as a function of the object to be examined once it is placed into the cavity.

Document EP 0 813 685 describes a scanner comprising radiofrequency windings.

Document CN 107 991 327 describes a left luggage room comprising an X-ray detector and optionally locking means for inspecting a piece of luggage when it is stored in the left luggage room.

Documents U.S. Pat. No. 5,659,247 and EP 3 372 188 describe metal detectors configured to be placed at the inlet of a waste bin to prevent medical personnel from accidentally throwing surgical instruments into the bin.

PRESENTATION OF THE INVENTION

In this context, the aim of the present invention is to propose novel solutions for analysis of pieces of luggage optimised to heighten the reliability, safety and throughput of individuals.

Another aim of the invention is to avoid the use of ionising radiation, recognised as often being dangerous to health, especially for populations made up of children and pregnant women.

The above aims are achieved according to the present invention by way of a system for detection of illicit objects contained in a piece of luggage and an associated detection process according to the attached independent claims. Embodiments form the subject of the dependent claims.

In particular, the system for detection of illicit objects contained in a piece of luggage is characterised in that it comprises a trolley defining a cavity open upwards for receiving a piece of luggage and fully enclosing the latter and examination means placed on and in the walls of the cavity such that the luggage is examined thoroughly by the examination means when resting on the bottom of the cavity.

Having a cavity which fully encloses the luggage ensures complete examination of the entire luggage. But this also protects the luggage during the time when its owner hands it over to allow examination. This reassures the owner and convinces him to entrust his luggage to the examination device. At the same time this also subjects the owner carrying the luggage to an additional examination, for example it subjects the bearer of the luggage to a metal detector, for example metal detectors, to detect any unauthorised objects or materials carried by the individual being checked.

According to another advantageous characteristic of the invention, the trolley defines a housing for receiving a piece of luggage and comprises examination means placed at the inlet of the housing such that introduction of the luggage into the housing causes relative displacement between the luggage and the examination means and therefore automatic scanning of the luggage by the examination means.

As will be understood from the following description the structure proposed according to the present invention which places the examination means at the inlet of the receiving housing ensures complete scanning of the luggage without requiring any particular instruction for the owner of the luggage, or intervention or complex handling from him. The device according to the present invention also operating by remote detection without mechanical contact on the luggage ensures perfect integrity of the luggage.

According to other advantageous characteristics of the invention:

the housing or cavity has a rectangular parallelepiped geometry, the trolley is equipped with casters, the housing or cavity has dimensions at least equal to 460 mm×250 mm×400 mm, and preferably up to 550 mm×300 mm×480 mm, the examination means comprise means using several different technologies, the examination means are selected from the group comprising: metal-detecting means by induction, microwave detector means of non-metallic material especially explosives, presence detector means and mass-measuring means, the examination means preferably comprise size-measuring means of pieces of luggage, the analysis means preferably comprise means for normalization of signals originating from microwave detectors as a function of the detected width of pieces of luggage, the metal-detecting means are placed in the large vertical sides of the housing or cavity, the microwave detector means comprise at least two series of transmitter/receivers associated with respective cones, arranged on two opposite sides of the housing or cavity, preferably four series of such transmitter/receivers associated with respective cones arranged respectively in the form of two pairs in the region of all the sides of the housing or cavity, more precisely on the discharge opening of the latter.

The present invention also relates to a process for detection of illicit objects contained in a piece of luggage, characterised in that it comprises the step consisting of placing the luggage in a housing formed by a cavity open upwards for receiving a piece of luggage and fully enclosing the latter, such that the luggage is examined thoroughly by the examination means when resting on the bottom of the cavity.

According to another advantageous characteristic of the invention, the process consists of placing a piece of luggage in a housing of a trolley equipped with examination means placed at the inlet of the housing such that introduction of the luggage into the housing causes relative displacement between the luggage and the examination means and therefore automatic scanning of the luggage by the examination means.

According to another advantageous characteristic of the invention, the process implements a trolley equipped with a housing and/or cavity, in combination with a metal detector adapted for scanning the body of an individual.

BRIEF DESCRIPTION OF THE FIGURES

Other characteristics, aims and advantages of the present invention will emerge from the following detailed description and with respect to the appended drawings given by way of non-limiting examples and in which.

DESCRIPTION OF AN EMBODIMENT

Figure 1:
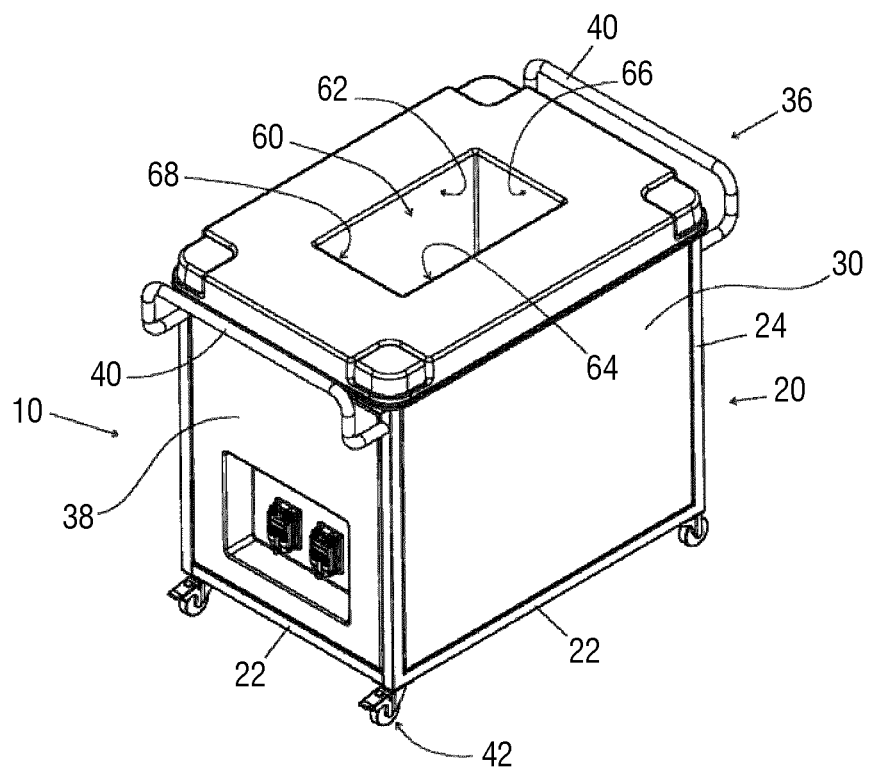
FIG. 1 illustrates a perspective view of a trolley according to the present invention.
Figure 2:
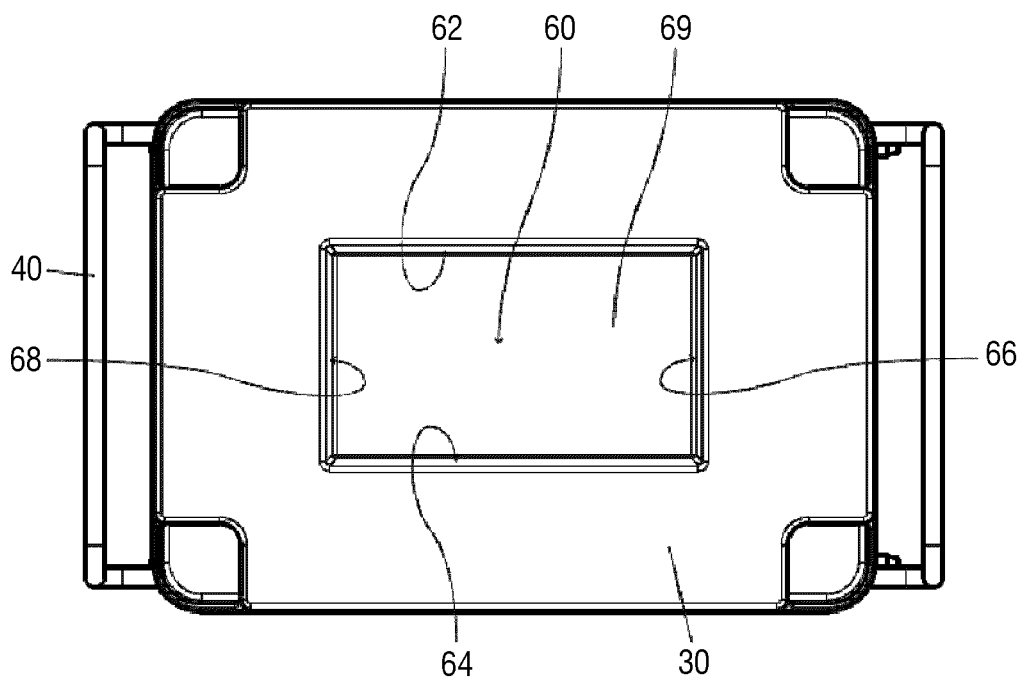
FIGS. 2, 3 and 4 illustrate respectively three plan views and front lateral view and side elevation of the trolley illustrated in FIG. 1.
Figure 3:
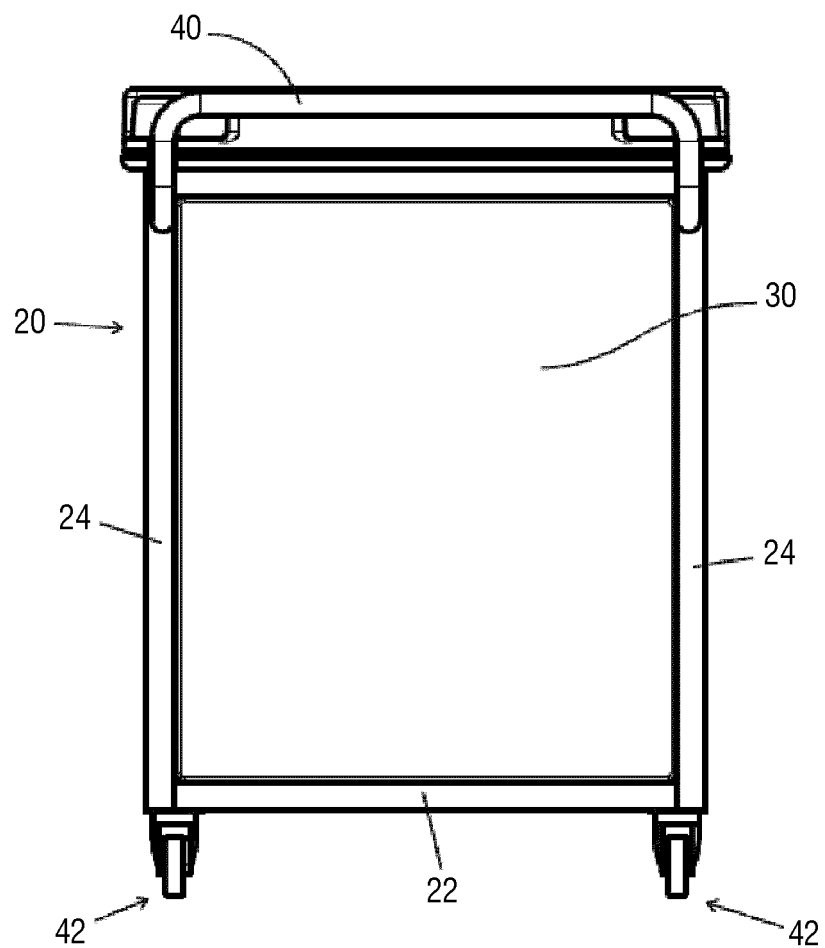
Figure 4:
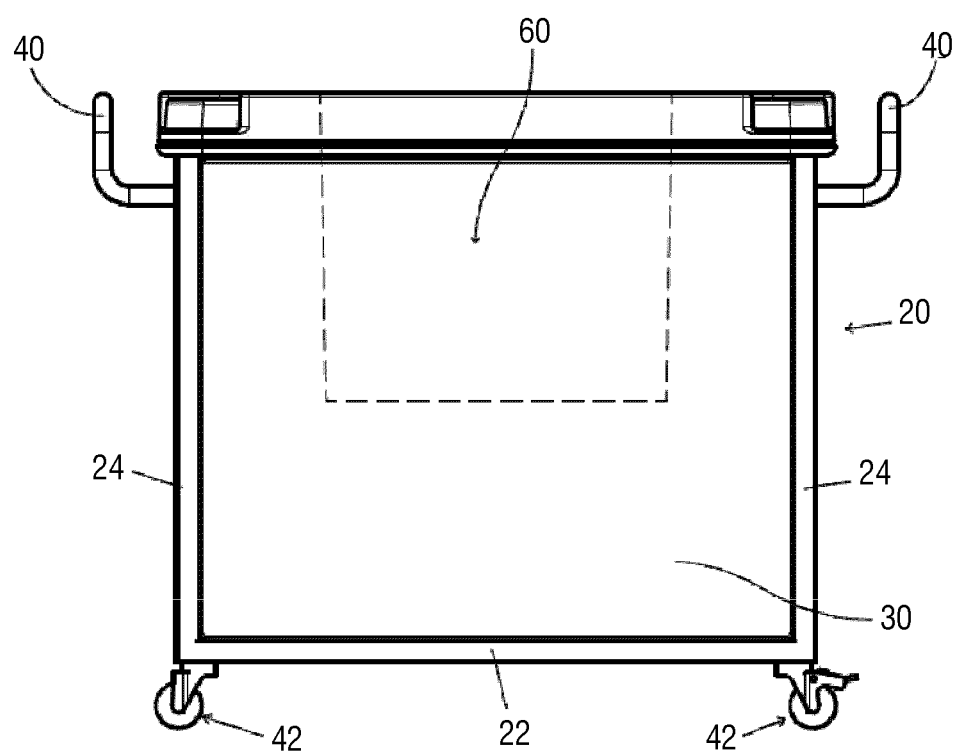

The appended figures, especially FIGS. 1, 2, 3 and 4, show a trolley 10 according to the present invention comprising a frame 20 formed by a set of longitudinal or transverse longerons 22 and uprights 24 equipped with a fairing or trim 30.

The trolley 10 which has an envelope completely in the form of a rectangular parallelepiped can form the subject matter of very many embodiments as to structure of this frame 20 and its external fairing 30. It will therefore not be described in detail hereinbelow in this respect.

Preferably, the trolley 10 is equipped with handles 40 to help it be moved and handled.

Also, as evident in the figures the trolley 10 is preferably fitted at its base and in the region of each of its angles with a locking and orientable caster 42 for easier travel of the trolley.

At the centre of the hollow trolley the assembly of the frame 20 and the external fairing 30 define a housing or cavity 60 open upwards.

The cavity 60 preferably has the geometry of a rectangular parallelepiped.

The dimensions of the cavity 60 are preferably at least equal to 460 mm in length, 250 mm in width and 400 mm in height and preferably up to 550 mm in length×300 mm in width×480 mm in height.

The applicant has determined that these dimensions were optimal for receiving and fully enclosing all pieces of luggage likely to be carried and utilised by individuals likely to access a wide range of public sites, sports or entertainment arenas for example.

The housing or cavity is delimited by 5 walls 62, 64, 66, 68 and 69, arranged on the interior of the fairing, preferably flat and rectangular in contour: two longitudinal vertical walls 62, 64 parallel to each other, two transverse vertical walls 66, 68 parallel to each other and orthogonal to the above walls 62, 64 and a horizontal bottom wall 69.

As pointed out earlier, the trolley 10 is equipped with examination means utilising a plurality of technologies. According to the invention these are contactless examination technologies. This ensures the total integrity of the luggage and complete analysis is performed without the need to open the luggage.

More precisely still, according to the invention the trolley 10 preferably comprises metal detector means 100, means 200 based on microwaves adapted for identifying materials contained in the examined luggage, especially explosives, mass-measuring means 300 of the luggage and if appropriate means for detecting the presence of luggage in the cavity 60 and/or means for measuring the dimensions of the luggage.

The metal-detecting means 100 are preferably formed by coils operating by inductive detection, placed in vertical side panels 32, 34 of the trolley, located parallel to the longitudinal walls 62, 64, between the latter and the external fairing 30. The windings placed in the panels 32, 34 are alternatively transmitter and receiver for emitting a magnetic field and detecting the influence of metallic parts located in the pieces of luggage being checked, especially by emission of Foucault current during relative displacement between the luggage and the windings and/or by modification of the frequency and of the phase of the magnetic field detected.

The technology of such metal detectors is well known per se to the skilled person and therefore will not be described in detail hereinbelow.

The panels 32, 34 and the windings incorporated into these panels preferably cover at least the entire surface of the longitudinal walls 62, 64 of the cavity 60 to ensure complete examination of the luggage.

However, each winding can be composed of several turns, each individually covering one part only of the surface of these walls 62, 64.

The detector means 200 of material and especially explosives, based on microwaves, are formed preferably by a plurality of microwave transmitter/receivers means 202 associated with cones forming respective antennae 204.

The means 200 are accordingly arranged in the form of two pairs of arrays of transducers 210, 212 and 220, 222 arranged respectively opposite. A first pair of an array of transducers 200, referenced respectively 210 and 212, is placed opposite on the longitudinal walls 62, 64 of the cavity 60. A second pair of an array of transducers 200, referenced respectively 220 and 222, is placed opposite on the transverse walls 66, 68 of the cavity 60.

By way of non-limiting example a row 210, 212 of five microwave transmitter/receiver transducers 202 can be provided on each of the two large sides 62, 64 of the trolley and a row 220, 222 of three microwave transducers 202 on each of the two small sides 66, 68 of the trolley.

Figure 5:
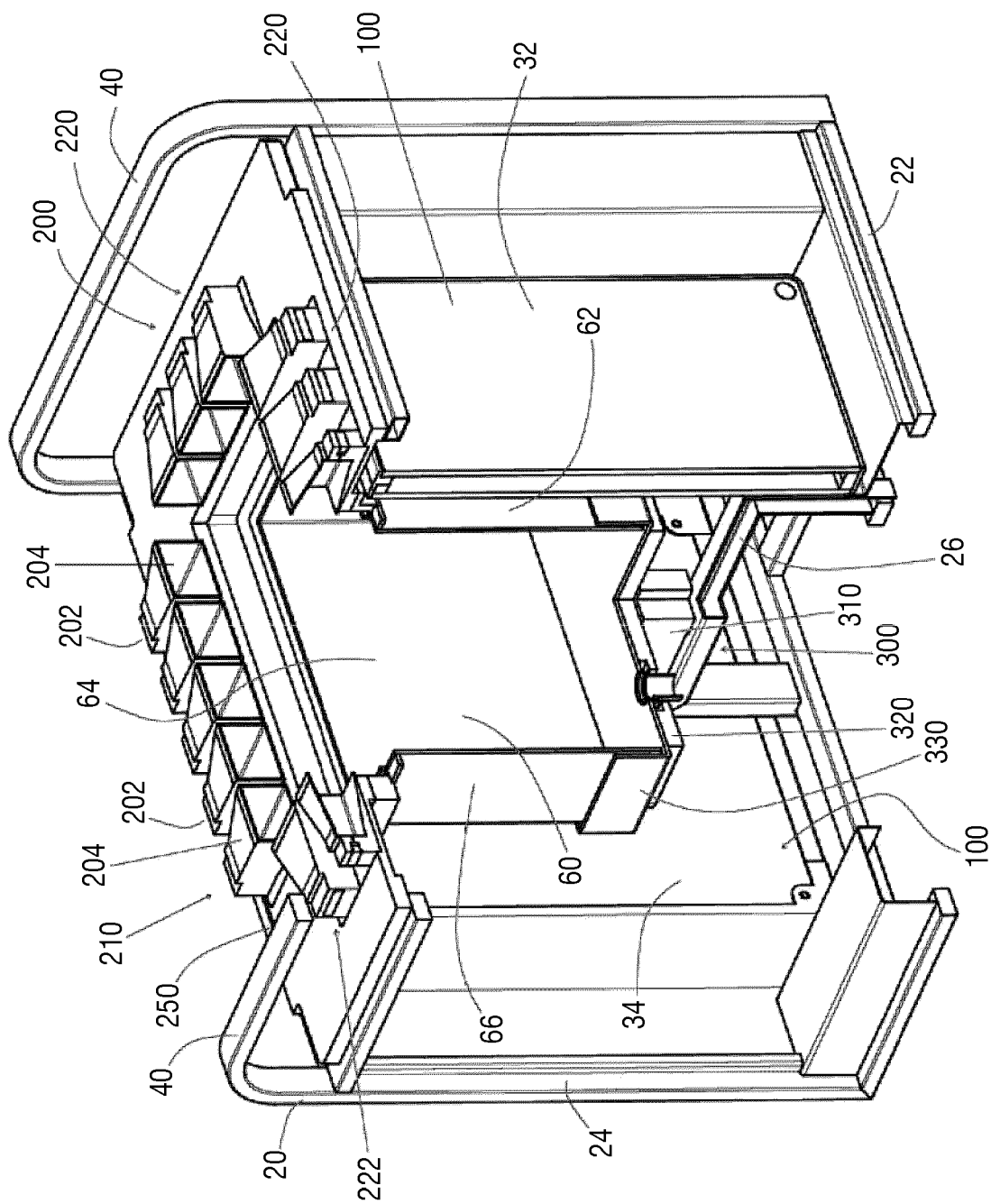
FIG. 5 illustrates a partial exploded view of a trolley according to the present invention revealing some of the examination elements incorporated into the trolley.
Figure 6:
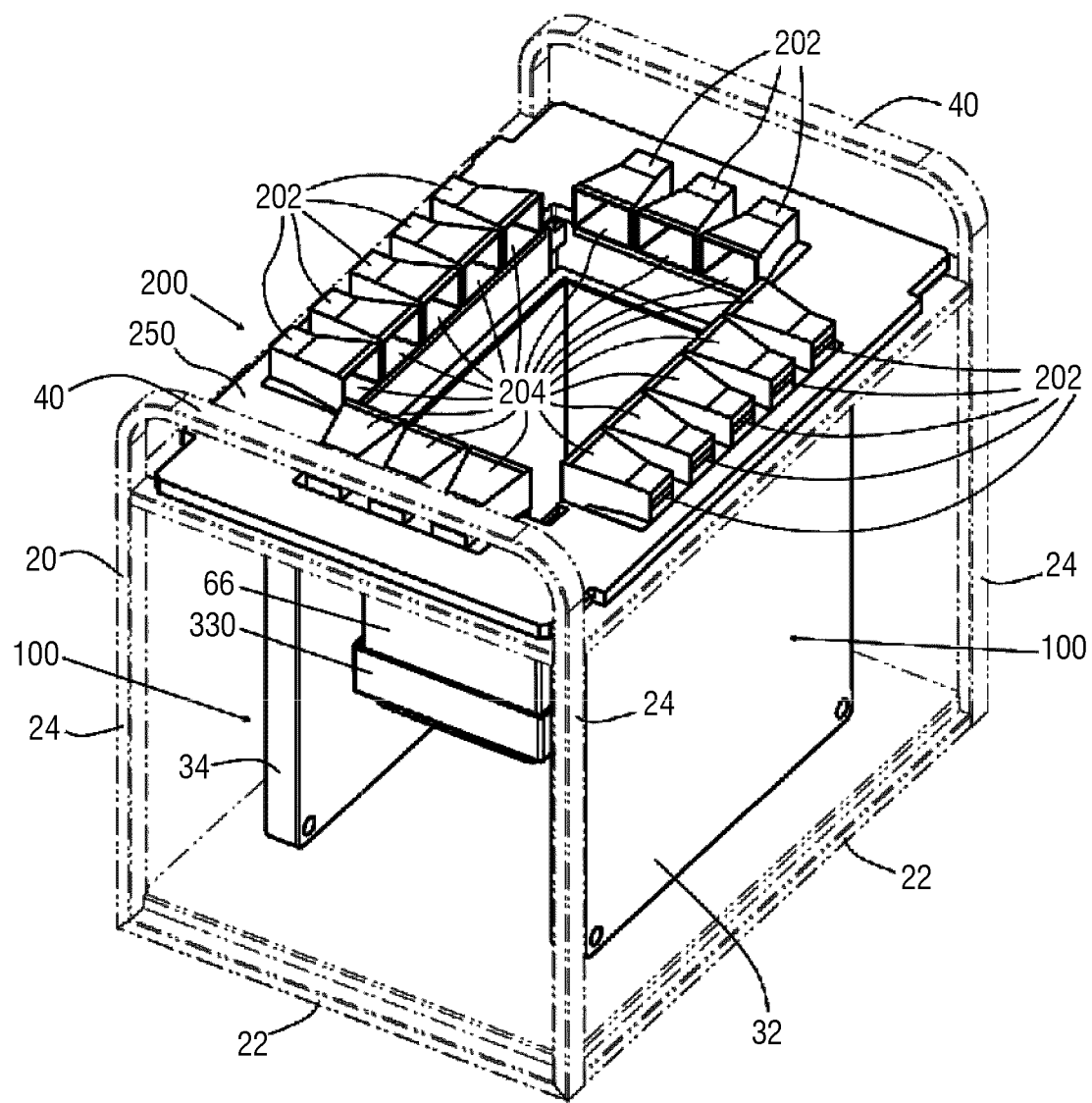
FIG. 6 illustrates another exploded view of the trolley according to the present invention.

More precisely still, as is evident from the appended figures, especially in FIGS. 5 and 6, these microwave transducers 202 associated with a respective cone 204 are arranged in the region of the opening contour of the cavity 60, or at the apex of the latter. So when a piece of luggage is introduced into the cavity 60, it is shifted opposite the transducers 200 such that introduction of the luggage into the housing 60 causes relative displacement between the luggage and these examination means 200 and therefore automatic scanning of the entire piece of luggage by the examination means 200. As opposed to devices of the prior art, which examine the object inspected after it is placed onto support provided for this purpose, scanning is performed automatically by the system according to the invention without requiring a particular instruction for the attention of the owner of the luggage, or intervention or complex handling from him. The luggage B simply has to be placed in the cavity 60.

More precisely in FIGS. 5 and 6, each of the transducer means successively forming actual microwave transmitter/receivers is referenced 202. In an embodiment the transducers 202 are associated with a focusing cone 204.

The transducers 202 preferably operate in a frequency range of between 5 and 30 GHz and highly preferably between 12 and 20 GHz.

The different transducers 202 located on one side of the opening contour of the cavity 60 are located respectively coaxially to a transducer 202 located opposite on the opposite panel.

Under the control of a central unit each transducer 202 can work alternatively as transmitter or receiver or as transmitter and receiver.

The beams transmitted between a transmitter 202 located on a first panel in the direction of a receiver 202 located on the opposite panel, which are not obscured by a piece of luggage or inserted object, reach the receivers after a slight delay due to transmission in air, without obvious attenuation in amplitude.

However, the beams sent by a transmitter 202 in the direction of an object or piece of luggage can be stopped or attenuated by the latter and cannot reach the opposite receiver 202 without alteration.

Controlling the transmitter/receivers couples 202 and analysis of the signals originating from a receiver 202 therefore detects the presence of a piece of luggage and/or a particular object inside the luggage, impermeable to microwaves.

According to the nature of the materials inserted on the trajectory of the microwave beams, some of the microwave radiation can be reflected towards the transmitter, especially in the presence of some metals.

The microwave beams which are transmitted between a transmitter 202 and a receiver 202, without being obscured by a piece of luggage or an object impermeable to microwaves, reach the opposite receiver 202 practically without delay and without obvious attenuation in amplitude, the delay depending solely on the swiftness of the microwaves in air.

When the material inserted on the trajectory of microwave radiation is partially opaque only to microwaves, the different interfaces of this material can generate successive echoes which are reflected towards the transmitter with different delays and the transmitted portion of the same radiation reaches the receiver after a delay and attenuation which are a function of the complex dielectric constant of the equipment, the frequency of the wave and the thickness of the equipment which the wave passes through.

Analysis of signals detected in this way on the receivers 202, relative to one of the reference signals, detects fraudulent objects introduced into a piece of examined luggage and determines its nature.

The skilled person in fact understands that detection of non-metallic fraudulent substances, explosives or drugs for example contained in a bag can be performed by detection of the delay and amplitude of microwave signals transmitted via the substance and/or reflected by the substance.

The analysis means according to the invention preferably operate by comparison of transmitted and/or reflected signals, with values of signals transmitted in air and/or signals reflected on walls of pieces of luggage made of known non-dangerous material or again reference signals obtained by examination of test materials of known kind.

The analysis means are adapted to generate an alarm when a significant deviation exceeding a threshold is detected relative to the reference values.

The analysis means are preferably adapted to perform at least one of the following steps, and preferably the combination of all the following steps:

measuring of the delay and amplitude of direct transmission of microwaves between each pair of coaxial transmitters and receivers 202 located on two opposite panels, measuring of the delay and amplitude of the microwave wave emitted by each transducer transmitter 202 and reflected towards the same transducer forming the receiver 202, detection of the presence of a double echo of microwave waves reflected by a fraudulent substance, comparison of microwave waves transmitted directly with a transmission reference value in a vacuum and transmission of an alarm in the event of detection of a delay greater than a threshold and with an amplitude corresponding to a substance spectrum which delays and attenuates the microwaves.

The process according to the invention can perform the comparison of a double echo detected with transmission values in a vacuum and generation of an alarm in case of detection of a delay greater than a threshold between the peaks of two echoes with amplitude greater than a threshold (representative of a substance which reflects part of the wave (first echo) and which delays and attenuates the unreflected signal (second echo)).

Within the scope of the invention the microwave transmitter and microwave receiver means 202 can also be adapted to utilise not only the signal coming from a coaxial receiver 202 situated opposite but also to utilise the signals coming from the other transmitter/receivers 202 enclosing the opposite coaxial transmitter.

Within the scope of the invention the housing or cavity 60 can also be equipped with means for detection of the presence of a piece of luggage in the housing or cavity 60.

Such detection means can be formed based on optical transmitter/receiver cells.

Such means can also be constituted by infrared detector means.

More precisely still, such infrared transmitter/receivers means can be used by utilising the time of two-way trajectory of infrared radiation reflected by a piece of luggage for measuring the dimensions of the luggage placed in the housing or cavity 60.

Given the dimensions of the luggage detected in this way, the analysis means can normalize the analysis, that is to say the output signal originating from the microwave transducers 200, and/or the signal originating from the metal detector, relative to a size unit of standard width.

This normalization which finds out the absorption properties of microwaves of the material detected for a value of standard unitary space or dimension improves the reliability of the system by improving the quality of detection of the nature of the material present in the luggage.

For this purpose, several pairs of infrared transmitter means and associated infrared receiver means can be provided, placed on either side of the cavity 60 so that the infrared beams emitted by each infrared transmitter means are reflected onto a piece of luggage before reaching the associated infrared receiver means placed on the same side of the cavity.

Figure 7:
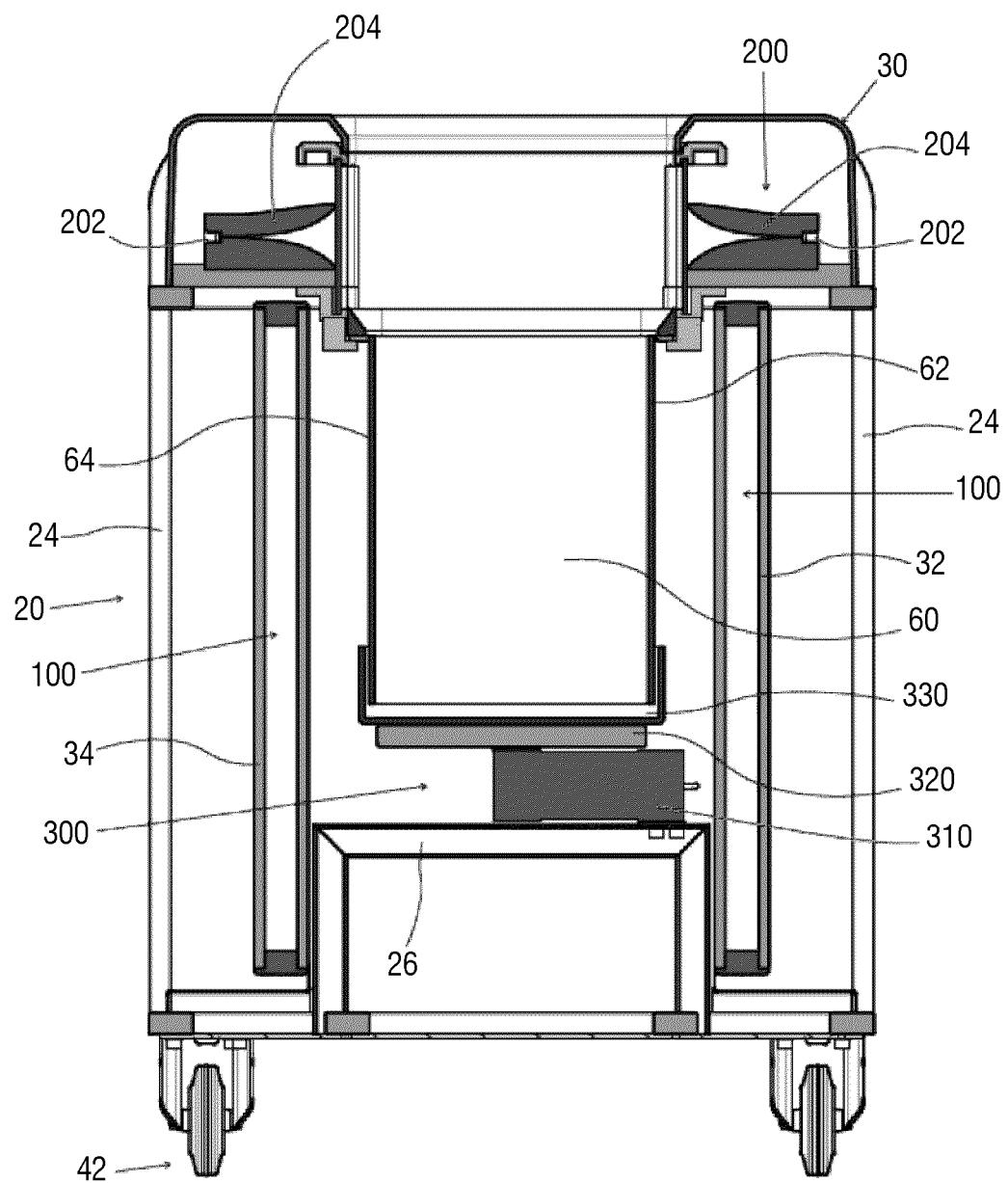
FIG. 7 illustrates a schematic view in vertical section of a trolley according to the present invention, according to a plane of transverse section.
Figure 8:
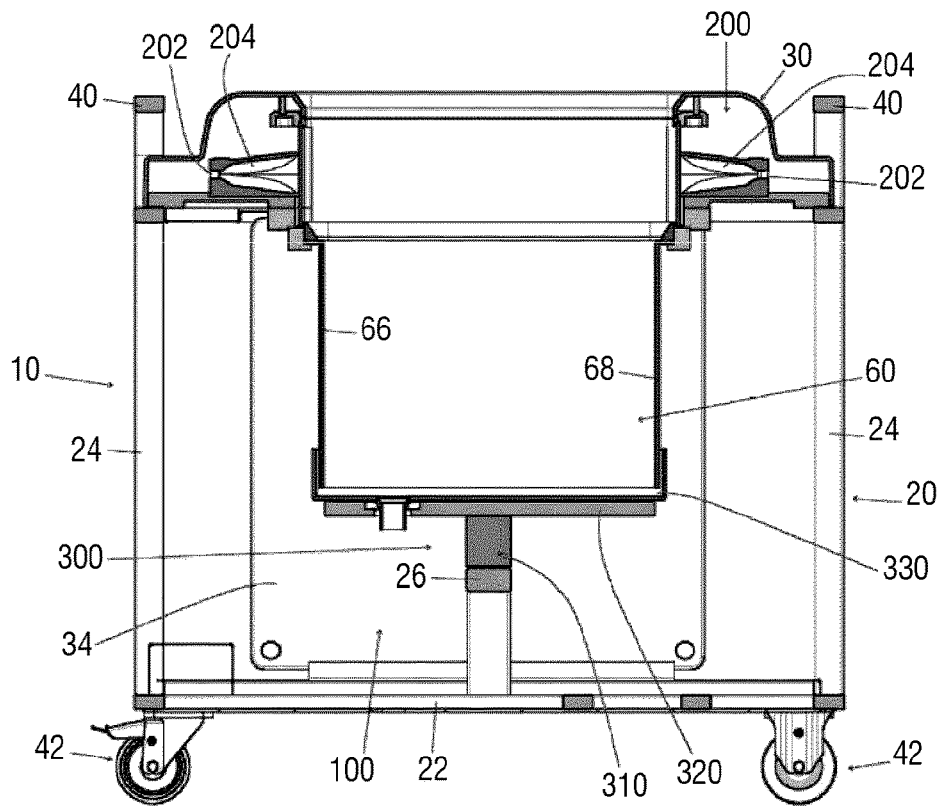
FIG. 8 illustrates a second view in vertical section of the same trolley according to a plane of longitudinal section orthogonal to that of FIG. 7.

As pointed out earlier, the trolley 10 according to the present invention is also preferably equipped with weighing means for finding out the mass of the luggage introduced into the cavity 60. These means are illustrated especially in FIGS. 7 and 8.

These mass weighing or measuring means can also act as detector for the presence of the luggage in the cavity 60.

This mass can also be used to normalize signals detected by the metal detector incorporated into the panels 32 34, as well as output signals from the microwave transducers 200.

The weighing means can form the subject matter of many embodiments.

As illustrated in FIGS. 5, 6, 7 and 8 these means 300 preferably comprise a strain gauge 310 inserted in between a support 26 connected to the base of the trolley 10 and a horizontal plate 320 attached to the bottom 330 of the cavity, which bottom 330 is susceptible to vertical articulation relative to the vertical walls 62, 64, 66 and 68 of the cavity 60.

The plate 320 is connected to the abovementioned bottom wall 69 of the cavity 60.

Figure 9:
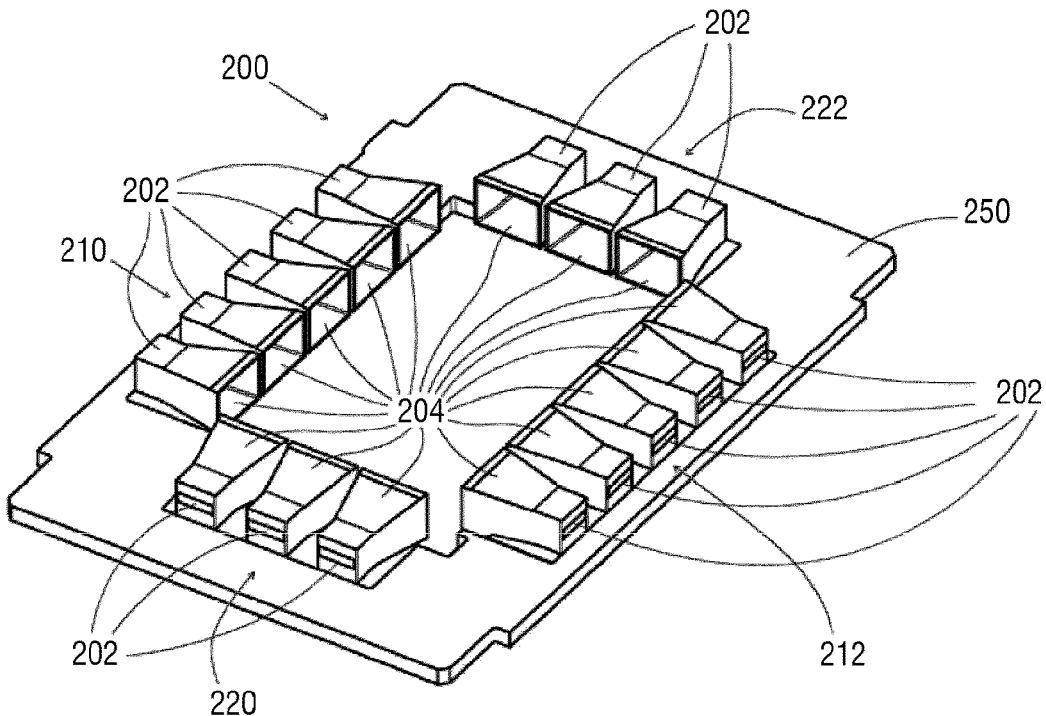
FIG. 9 illustrates a perspective view of a support plane supporting transmitter/receivers and cones associated with microwaves according to the invention, as well as a central analysis unit, FIG. 10 schematically illustrates the main steps of the detection process according to the present invention, FIG. 11 schematically illustrates the implanting of a trolley according to the present invention in combination with a metal detector.

FIG. 9 illustrates a base 250 which bears the four matrices 210, 212, 220 and 222 of the microwave transducers 202 associated with respective focusing cones 204. This base 250 can carry the central signal-processing unit.

The trolley according to the present invention can be equipped with any additional useful detection means, for example means for sampling and analysis of substance, vapour or traces of particles and/or analysis means of magnetic nuclear resonance type, analysis means of complex impedance and/or means for detecting radioactive radiation.

Such means are known per se in their general structure and therefore will not be described in more detail hereinbelow.

The trolley according to the present invention can be fitted with signaling means of sound or light type for issuing alarms.

The analysis means according to the present invention are preferably adapted to program the sensitivity of the metal detector means 100 and microwave detector means 200.

Programming the metal detector means 100 especially selectively adjusts the sensitivity for detection of metallic magnetic and/or non-magnetic composition. It also controls the sensitivity as a function of the threshold size selected for the preferred metallic objects.

The same applies for adjusting the sensitivity of the microwave transducers 200 which adapts detection to the preferred dielectric characteristics, especially those of explosives.

The detection trolley 10 according to the present invention can be combined advantageously with a metal detector gate G.

This arrangement is illustrated in FIGS. 11 to 16.

Figure 11:
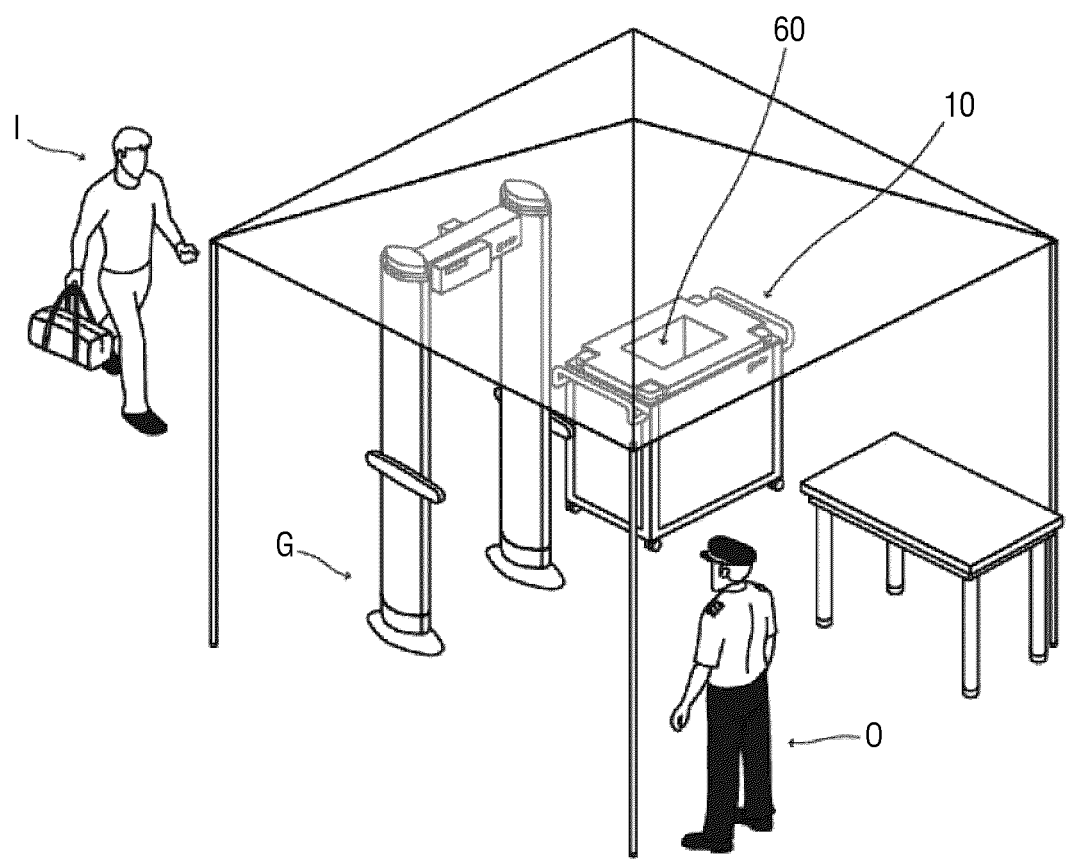

FIG. 11 in fact shows a trolley 10 placed adjacent to a metal detector gate G.

Such a metal gate detector G is known per se and will therefore not be described in detail hereinbelow.

It can be noted that the trolley 10 is preferably oriented with its large dimension perpendicular to the direction of transit through the gate G, as illustrated in FIGS. 11 to 16.

This arrangement minimises the electromagnetic coupling between the gate G of the inductive transmitter/receiver detection means incorporated into the trolley 10 for examination of pieces of luggage. This arrangement also makes insertion and withdrawal of a piece of luggage in the cavity 60 on the side of the gate G easy for anyone transiting through this gate.

FIG. 11 shows an individual I equipped with luggage B approaching a check point.

Figure 12:
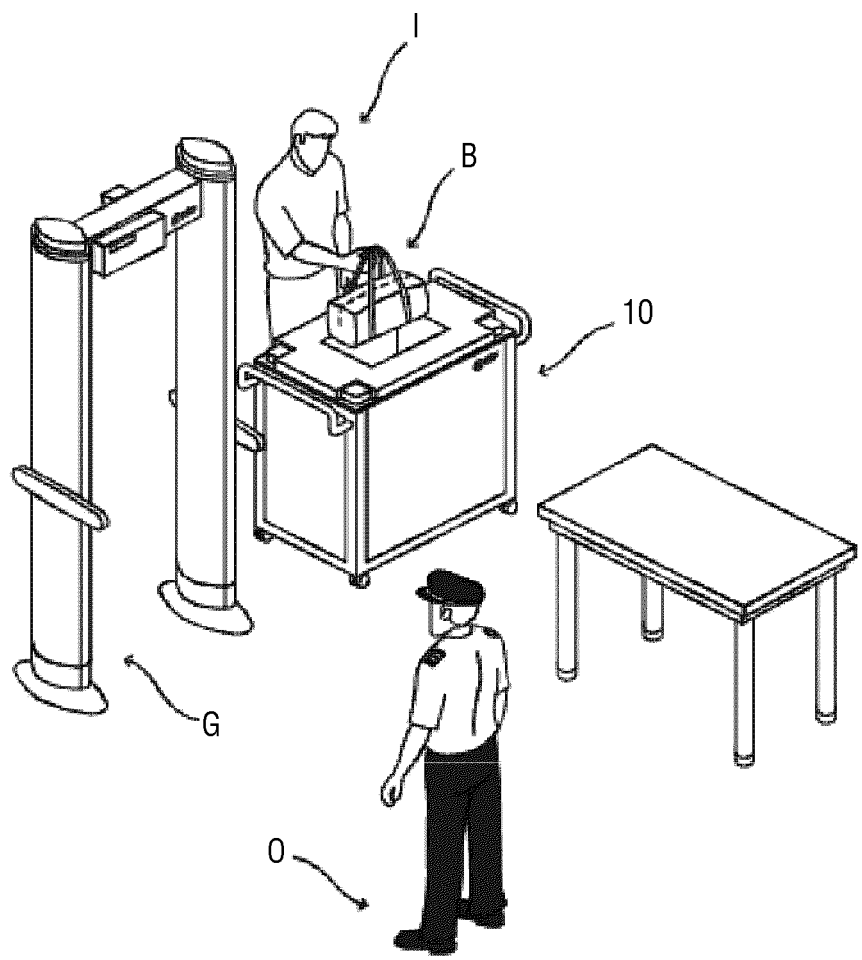
FIGS. 12, 13, 14, 15 and 16 illustrate five successive steps of use of the trolley according to the present invention.

FIG. 12 illustrates the individual I introducing the luggage B into the cavity 60 of the trolley 10 according to the invention.

Figure 13:
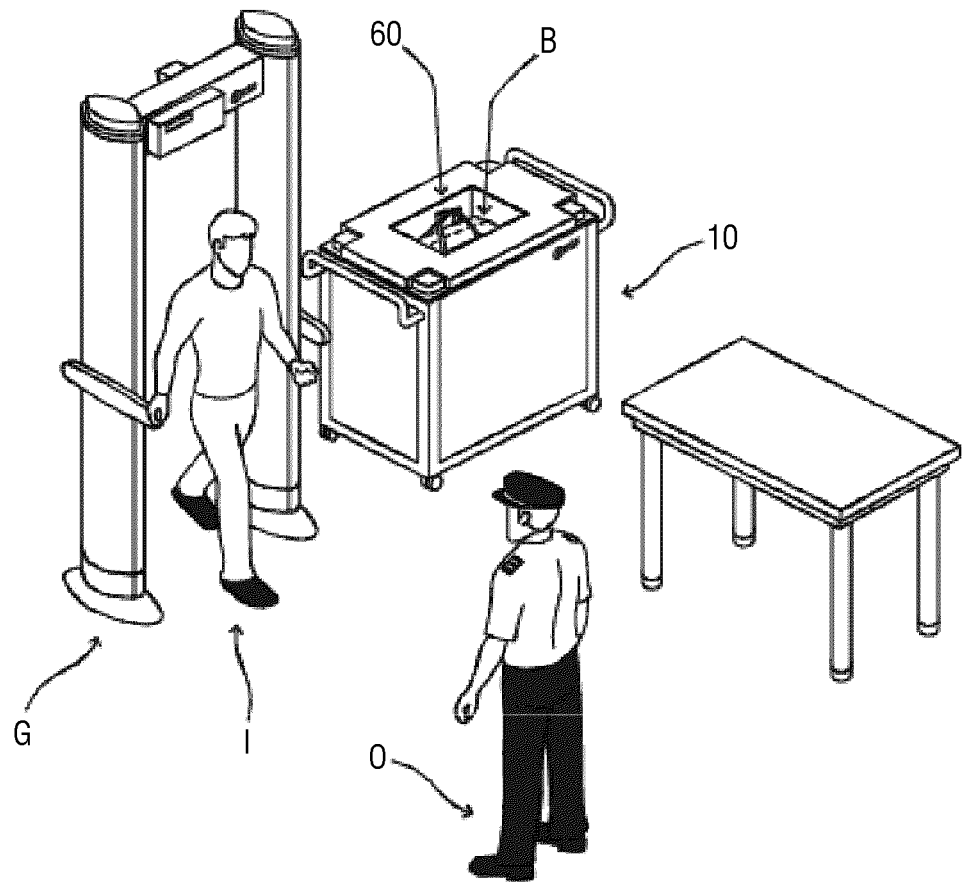

FIG. 13 shows the individual I passing through the gate G. During this step the luggage B placed in the cavity 60 is analysed automatically by the analysis structure according to the invention incorporated into the trolley 10.

Figure 14:
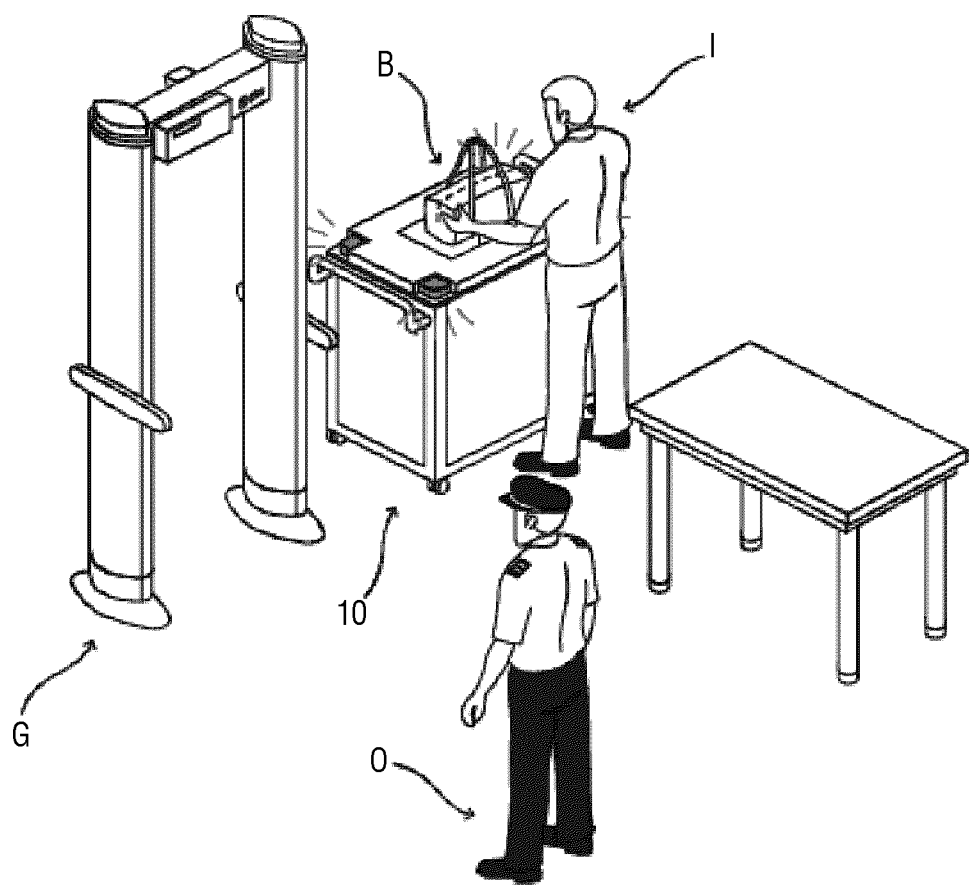

FIG. 14 illustrates the individual I retrieving his luggage B after passing through the gate G in the event where no suspect object has been detected in the luggage B by the trolley 10.

Figure 15:
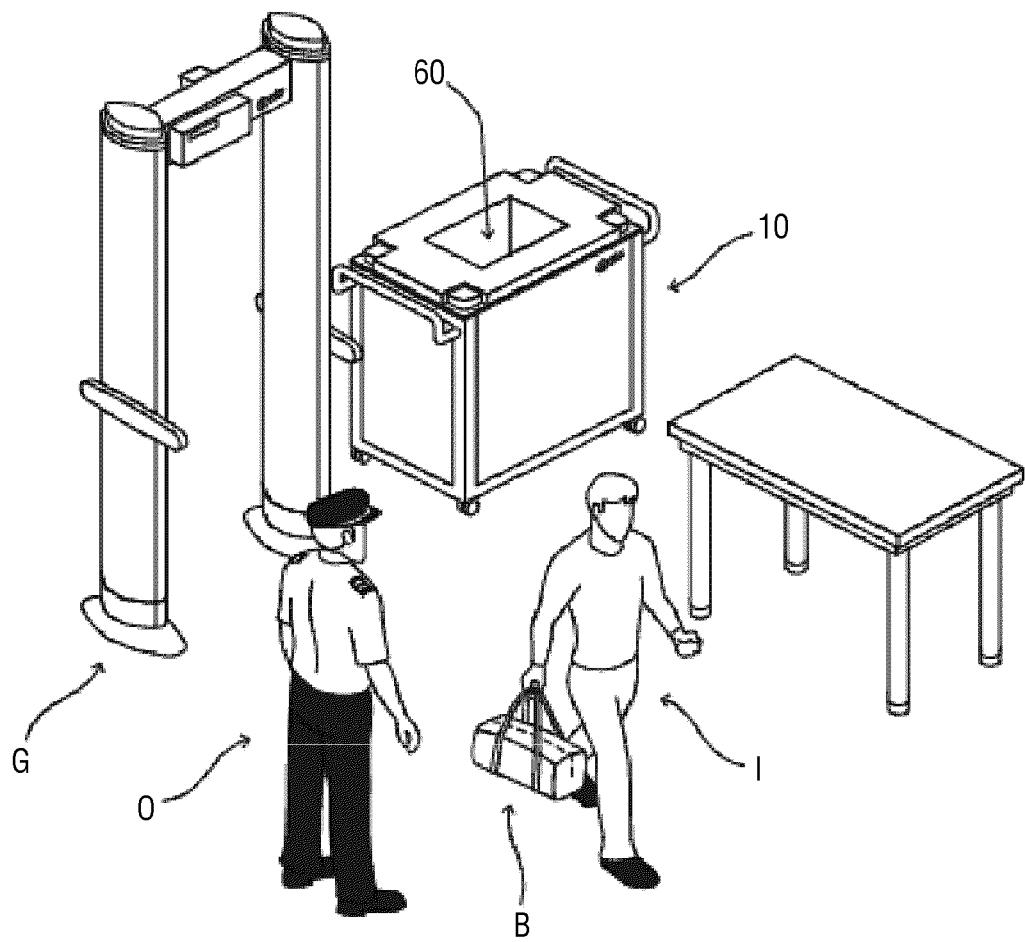

FIG. 15 shows the individual I in this case leaving the control zone.

Figure 16:
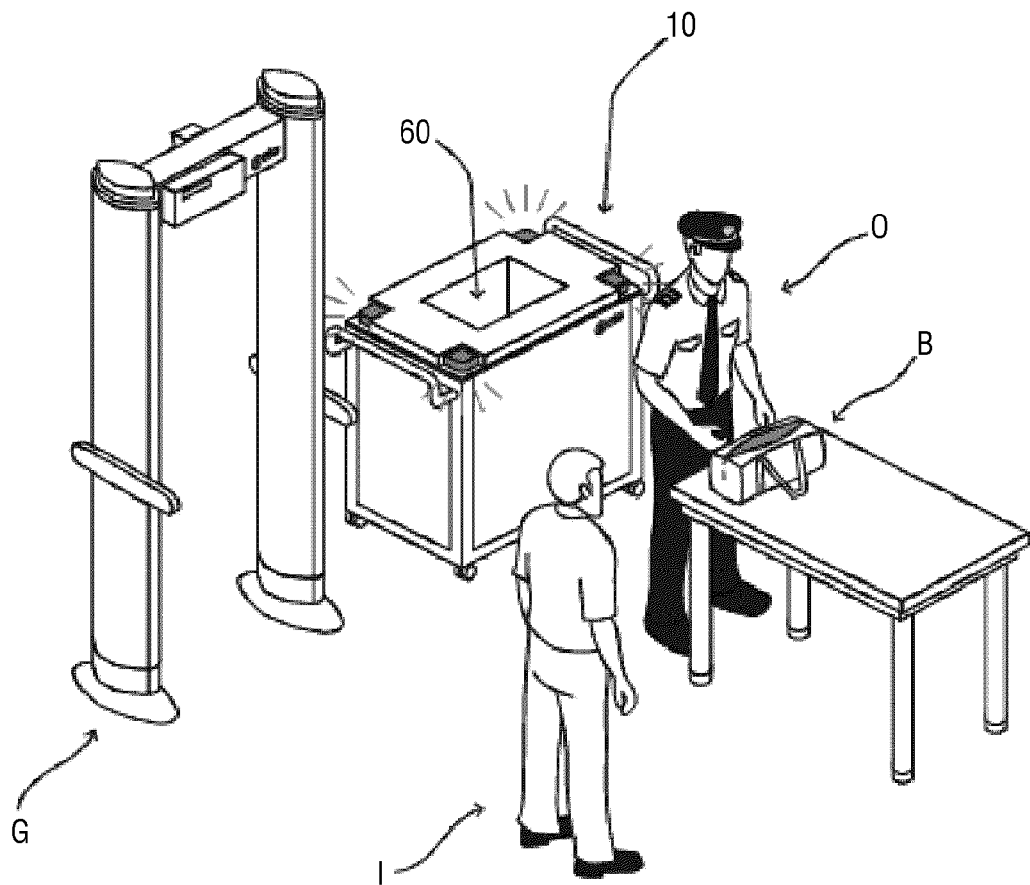
Figure 17:
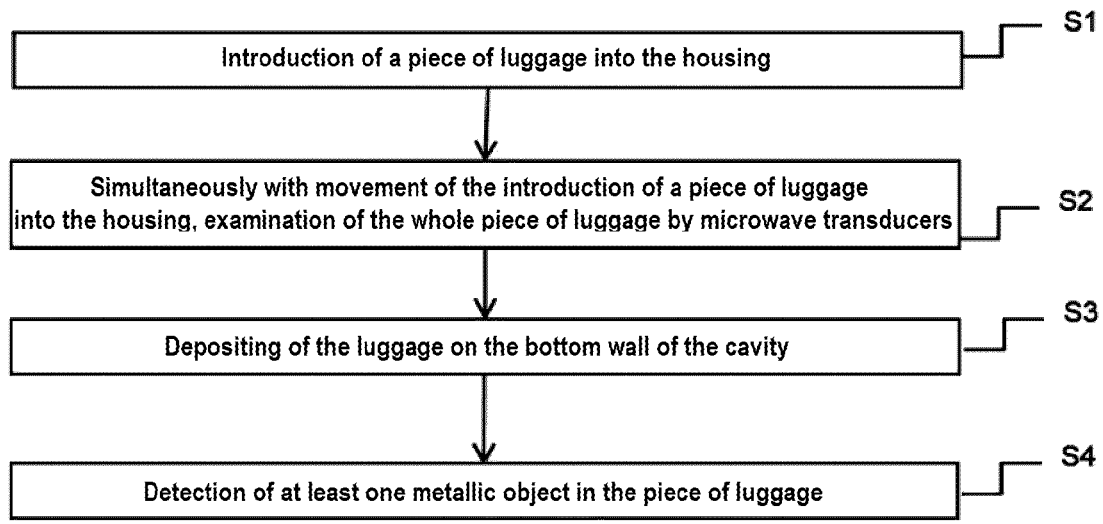
FIG. 17 is a flowchart illustrating steps of an example of a detection process according to an embodiment of the invention.

On the contrary, FIG. 16 shows an operator O carrying out examination of the luggage B after the step of FIG. 13 when the trolley 10 according to the invention has generated an alarm signaling the suspected presence of a potentially dangerous object in the luggage B.

The trolley 10 according to the present invention offers the following advantages especially:
- the trolley 10 can have low power consumption,
- the trolley 10 can be equipped with low-voltage analysis means and a rechargeable electric battery to make the trolley autonomous.

The trolley 10 according to the invention includes no technical or mobile mechanical part for examination of the luggage B and therefore is considerably reliable.

The trolley 10 according to the invention uses no ionising radiation and is therefore perfectly safe for the populations being examined as well as for nearby operators.

The trolley 10 according to the invention allows for simple and comfortable use both for the individuals I being checked and for the professional operators O.

Except for an alarm, the trolley 10 requires neither assistance nor an operator.

According to another advantageous characteristic of the invention, the trolley 10 according to the invention can be equipped with plastic trays or interchangeable plastic sachets in the cavity 60 for receiving the luggage B to be checked for better maintenance operations and cleanliness.

The microwave analysis means preferably operate by measuring the complex dielectric constant.

Figure 10:
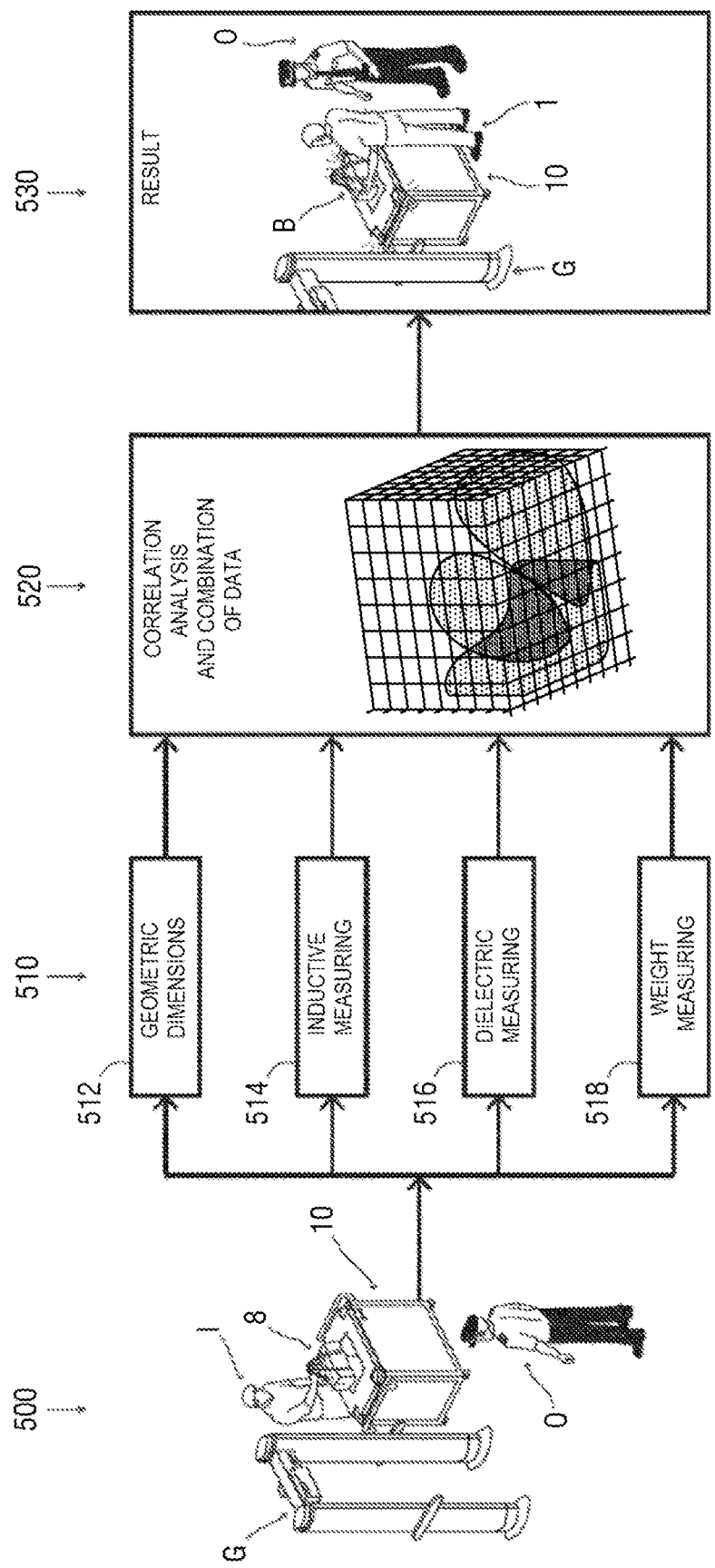

As seen in FIG. 10, all measurements made by the examination means 100, 200 incorporated into the trolley 10 during a step 500 specifically the geometric dimensions 512 of the luggage B, the result 514 of inductive measuring originating from the metal-detecting means 100 and the result 516 of analysis originating from the microwave detector means 200 detecting the dielectric parameters of objects contained in the luggage B and weight measuring 518, collected in this way during a step 510, via a search for correlation performed during a step 520 find out the location, geometry and dimensions of suspect materials, especially of metallic objects and/or dangerous substances such as explosives, and issues an alarm during a step 530, if needed.

Of course, the present invention is not limited to the embodiments which have just been described, but extends to all variants according to its sense.

It is pointed out that the invention ensures complete scanning of the luggage without requiring particular instruction for the attention of the owner of the luggage, or intervention or complex handling from him or a trained professional, due to arrangement of the examination means at the inlet of the receiving housing.

It is also pointed out that the invention ensures the perfect integrity of the luggage.

It is finally pointed out that the invention ensures complete examination of the entire piece of luggage and protects the luggage during the time when its owner hands it over to allow examination, due to the fact that the cavity is adapted to fully enclose the luggage.

The invention claimed is:

1. A detection system comprising:
a trolley comprising side walls and a bottom wall defining a cavity open upwards, wherein the cavity is configured to fully enclose a piece of luggage; and
analysis means comprising microwave transducers arranged on at least two side walls which are opposite to each other such that the piece of luggage is completely examined by the analysis means when resting on the bottom wall, wherein the analysis means are adjacent an inlet of the cavity such that introduction of the piece of luggage into the cavity causes relative displacement between the piece of luggage and the analysis means and therefore automatic scanning of the piece of luggage by the analysis means.

2. The detection system of claim 1, wherein the trolley comprises casters.

3. The detection system according of claim 1, wherein dimensions of the cavity are at least equal to 460 mm×250 mm×400 mm.

4. The detection system of claim 1, wherein the cavity has a rectangular parallelepiped geometry.

5. The detection system of claim 1, wherein the analysis means comprise microwave transducers and detection means which are distinct from microwave transducers.

6. The detection system of claim 1, wherein the analysis means comprise microwave transducers and at least one of the following means: metal-detecting means, mass-detecting means, presence-detecting means.

7. The detection system of claim 1, wherein the analysis means comprise microwave transducers comprising a plurality of microwave transmitters associated with focusing cones.

8. The detection system of claim 1, wherein the analysis means are arranged around an entire periphery of an opening contour of the cavity.

9. The detection system of claim 1, wherein the analysis means also comprise inductive windings arranged on two opposite side walls which are opposite to each other for detection of metal.

10. The detection system of claim 1, also comprising measuring means configured to measure dimensions of a piece of luggage introduced into the cavity.

11. The detection system of claim 10, further comprising processing means configured to normalize signals from the analysis means as a function of the dimensions of the piece of luggage.

12. The system according to claim 1, wherein dimensions of the cavity are up to 550 mm×300 mm×480 mm.

13. A detection method comprises the following steps:
introduction of a piece of luggage into a cavity of a trolley, wherein the cavity is defined by side walls and a bottom wall of the trolley such that the cavity fully encloses the piece of luggage, wherein the cavity comprises an open end opposite the bottom wall of the trolley; and
placing the piece of luggage onto the bottom wall of the trolley by moving the piece of luggage from the open end of the cavity to the bottom wall of the trolley such that the whole piece of luggage is scanned and analysed by analysis means arranged on at least two opposite side walls of the trolley.

14. The detection method of claim 13, also comprising a step for detection of at least one metal object in the piece of luggage when the piece of luggage is placed on the bottom wall of the trolley.

* * * * *